US012231632B2

(12) United States Patent
Xu et al.

(10) Patent No.: US 12,231,632 B2
(45) Date of Patent: Feb. 18, 2025

(54) METHODS OF PARAMETER SET SELECTION IN CLOUD GAMING SYSTEM (71) Applicant: TENCENT AMERICA LLC, Palo Alto, CA (US)

(72) Inventors: Xiaozhong Xu, State College, PA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/361,973

(22) Filed: Jun. 29, 2021

(65) Prior Publication Data
US 2022/0046237 A1 Feb. 10, 2022

Related U.S. Application Data (60) Provisional application No. 63/062,759, filed on Aug. 7, 2020.

(51) Int. Cl.
*H04N 19/117* (2014.01)
*G06N 20/00* (2019.01)
(Continued)

(52) U.S. Cl.
CPC ........... *H04N 19/117* (2014.11); *G06N 20/00* (2019.01); *H04N 19/46* (2014.11); *H04N 19/70* (2014.11); *H04N 19/80* (2014.11)

(58) Field of Classification Search
None
See application file for complete search history.

(56) References Cited

U.S. PATENT DOCUMENTS

2013/0142251 A1   6/2013 Maani
2017/0347112 A1*  11/2017 Zhang .................... H04N 19/68
(Continued)

FOREIGN PATENT DOCUMENTS

CN   111066326 A    4/2020
JP   2017-153145 A  8/2017
(Continued)

OTHER PUBLICATIONS

Shan Liu, "JVET AHG report: Neural Networks in Video Coding (AHG9)", Joint Video Experts Team (JVET) of ITU-T SG 16 WP 3 and ISO/IEC JTC 1/SC 29/WG 11, JVET-J0009-v1, Apr. 10-20, 2018, pp. 1-3, 10th Meeting, San Diego, US.
(Continued)

*Primary Examiner* — Stuart D Bennett
(74) *Attorney, Agent, or Firm* — Sughrue Mion, PLLC (57) ABSTRACT

Video coding and decoding methods, apparatuses, and storage medium are provided. The encoding method includes training a model for determining a parameter set to be used for encoding; obtaining a video content; determining the parameter set for encoding the video content using the trained model; encoding the video content according to the parameter set; transmitting the encoded video content to a decoding device; and transmitting the parameter set to the decoding device. The decoding method includes receiving an encoded video content from an encoding device; determining whether a parameter set is received from the encoding device; based on determining that the parameter set is received, decoding the encoded video content according to the parameter set; and transmitting the decoded video content to a display device.

11 Claims, 7 Drawing Sheets

(51) Int. Cl.
*H04N 19/46* (2014.01)
*H04N 19/70* (2014.01)
*H04N 19/80* (2014.01)

(56) References Cited

U.S. PATENT DOCUMENTS

| | | | |
|---|---|---|---|
| 2017/0359580 A1* | 12/2017 | Su | H04N 19/179 |
| 2018/0192046 A1* | 7/2018 | Teo | H04N 19/176 |
| 2018/0288419 A1 | 10/2018 | Yu et al. | |
| 2019/0028705 A1 | 1/2019 | Xu et al. | |
| 2019/0075301 A1* | 3/2019 | Chou | H04N 19/46 |
| 2021/0304355 A1* | 9/2021 | Delattre | G06T 1/20 |
| 2022/0070527 A1* | 3/2022 | Kojima | G06F 13/00 |

FOREIGN PATENT DOCUMENTS

| | | |
|---|---|---|
| JP | 2021-57766 A | 4/2021 |
| KR | 10-2016-0032109 A1 | 3/2016 |

OTHER PUBLICATIONS

Yiming Li, "Methodology and reporting template for neural network coding tool testing", Joint Video Experts Team (JVET) of ITU-T SG 16 WP 3 and ISO/IEC JTC 1/SC 29/WG 11, JVET-M1006-v1, Jan. 9-18, 2019, pp. 1-4, 13th Meeting, Marrakech, MA.

Dong Liu et al., "Deep Learning-Based Technology in Responses to the Joint Call for Proposals on Video Compression with Capability beyond HEVC", IEEE Transactions on Circuits and Systems for Video Technology, pp. 1-14.

Han Zhu et al., "Residual Convolutional Neural Network Based In-Loop Filter With Intra and Inter Frames Processed Respectively for AVS3", pp. 1-6.

International Search Report issued Oct. 5, 2021 in International Application No. PCT/US2021/041250.

Written Opinion of the International Searching Authority issued Oct. 5, 2021 in International Application No. PCT/US2021/041250.

Extended European Search Report dated Oct. 25, 2022 in European Application No. 21853390.9.

Japanese Office Action dated Sep. 5, 2023 in Japanese Application No. 2022-531440.

Communication dated Apr. 29, 2023 issued by the Korean Patent Office in application No. 10-2022-7012345.

\* cited by examiner

METHODS OF PARAMETER SET SELECTION IN CLOUD GAMING SYSTEM

CROSS-REFERENCE TO RELATED APPLICATION

This application is based on and claims priority to U.S. Provisional Application No. 63/062,759 filed on Aug. 7, 2020, in the United States Patent and Trademark Office, the disclosure of which is incorporated by reference herein in its entirety.

BACKGROUND

1. Field

The disclosure relates to the field of multimedia technology, and in particular, to a network-based gaming system and a method of providing a network-based gaming service.

2. Description of Related Art

Cloud gaming service is a trending online service that is provided by multiple service providers. Cloud gaming may also be referred to as gaming on-demand. In a cloud gaming system, users may play games remotely based on gaming services provided from a cloud server. That is, the games may run on the remote cloud servers, and the contents of the games may be transmitted from the remote cloud servers to a user's device via video streaming, and displayed on a display of the user's device.

However, the cloud gaming requires significant technical infrastructure in order to provide gaming services to multiple users. For example, a high-speed Internet service may be required for the delivery of large amounts of video content, and a large data center or server may be required for rendering the video content, compressing the video content, and delivering video content to consumers in real time. On the user side, because not all users may have powerful game-playing hardware (e.g., game consoles, personal computers (PCs) and mobile phones), there is a need for powerful encoding on the server side so that a computer with only normal video decoding capability on the user side may receive the encoded content and process the large amount of data related to the cloud gaming. Also, there is a need for recognizing the encoding scheme and effectively decoding the encoded video content according to the encoding scheme used on the server side.

One approach for enhancing the speed and quality of cloud gaming service is by using a learning-based video coding. Recently, learning based methods using a neural network (NN) have been introduced into video coding. In such a video coding approach, optimal coding parameters such as filter coefficients are typically trained through a large amount of diversified training data. However, there is a need for efficiently training a video coding model and to improve accuracy of the video coding. Accordingly, one or more learning-based video coding systems and methods are provided to improve speed and quality of the cloud gaming service.

SUMMARY

According to an embodiment, there is provided a method of performing video coding in a network-based system, performed by an encoding device. The method includes: training a model for determining a parameter set to be used for encoding; obtaining a video content; determining the parameter set for encoding the video content using the trained model; encoding the video content according to the parameter set; transmitting the encoded video content to a decoding device; and transmitting the parameter set to the decoding device.

According to an embodiment, there is provided a method of performing video decoding in a network-based system, performed by a decoding device. The method includes: receiving an encoded video content from an encoding device; determining whether a parameter set is received from the encoding device; based on determining that the parameter set is received, decoding the encoded video content according to the parameter set; and transmitting the decoded video content to a display device.

According to an embodiment, there is provided an encoding device including: at least one memory storing compute program code; and at least one processor configured to access the at least one memory and operate as instructed by the computer program code. The computer program code includes: training code configured to cause the at least one processor to train a model for determining a parameter set to be used for encoding; obtaining code configured to cause the at least one processor to obtain a video content; determining code configured to cause the at least one processor to determine the parameter set for encoding and/or decoding the video content using the trained model; encoding code configured to cause the at least one processor to encode the video content according to the parameter set; and transmitting code configured to cause the at least one processor to control a communication interface to transmit the encoded video content and the parameter set to a decoding device.

According to an embodiment, there is provided a decoding device including: at least one memory storing compute program code; and at least one processor configured to access the at least one memory and operate as instructed by the computer program code. The computer program code includes: receiving code configured to cause at least one processor to receive an encoded video content from an encoding device; first determining code configured to cause at least one processor to determine whether a parameter set is received from the encoding device; decoding code configured to cause at least one processor to, based on determining that the parameter set is received, decode the encoded video content according to the parameter set; and transmitting code configured to cause at least one processor to control a communication interface to transmit the decoded video content to a display device.

According to an embodiment, there is provided a non-transitory computer-readable storage medium storing computer program code, the computer program code, when executed by at least one processor is configured to: train a model for determining a parameter set to be used for encoding; obtain a video content; determine the parameter set for encoding and/or decoding the video content using the trained model; encode the video content according to the parameter set; transmit the encoded video content to a decoding device; and transmit the parameter set to the decoding device.

According to an embodiment, there is provided a non-transitory computer-readable storage medium storing computer program code, the computer program code, when executed by at least one processor, is configured to: receive an encoded video content from an encoding device; determine whether a parameter set is received from the encoding device; based on determining that the parameter set is received, decode the encoded video content according to the parameter set; and transmit the decoded video content to a display device.

BRIEF DESCRIPTION OF THE DRAWINGS

The following description briefly introduces the accompanying drawings, which illustrate one or more embodiments of the disclosure.

DETAILED DESCRIPTION

Example embodiments are described in detail herein with reference to the accompanying drawings. It should be understood that the one or more embodiments of the disclosure described herein are only examples, and should not be construed as limiting the scope of the disclosure.

Hereinafter, the term "encoding device" is used interchangeably with the term "encoder." Also, the term "decoding device" is used interchangeably with the term "decoder."

Figure 1:
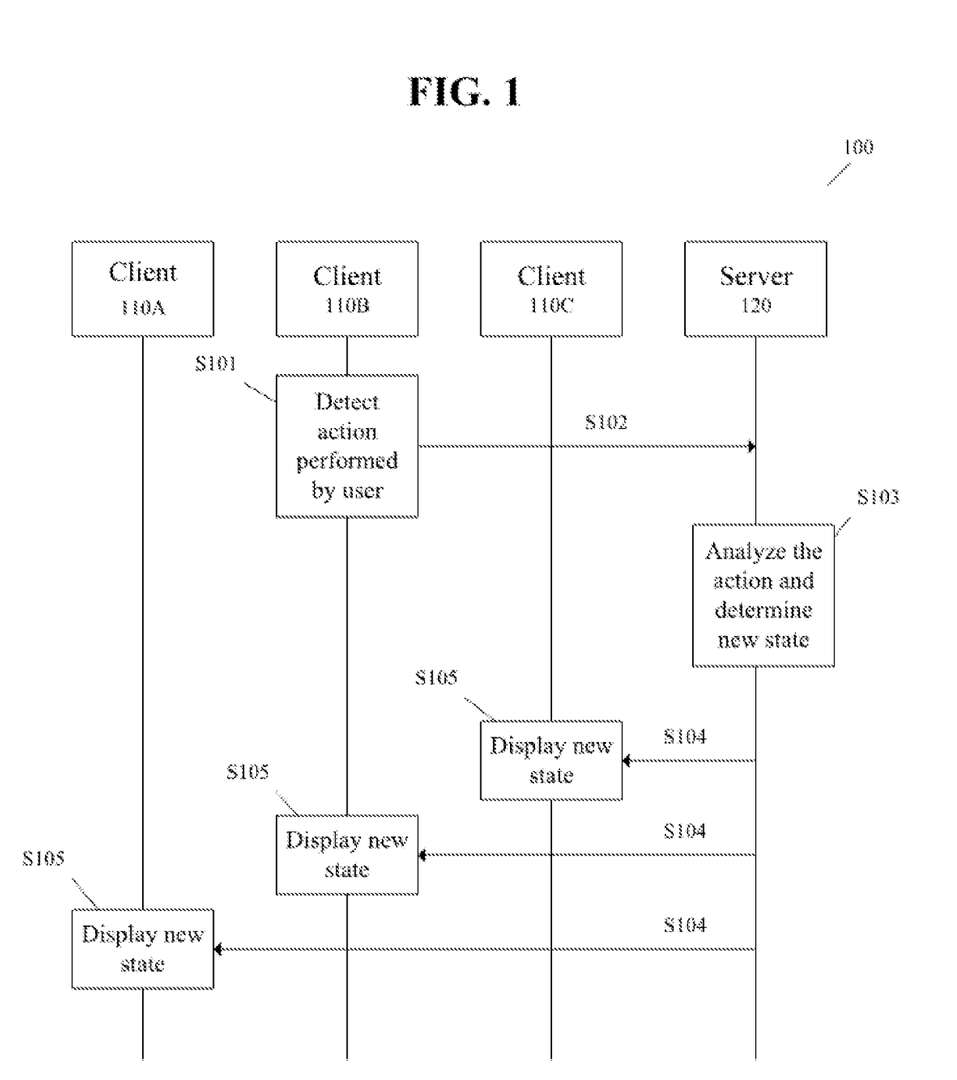
FIG. 1 is a sequence diagram illustrating a network-based gaming system according to an embodiment.

FIG. 1 is a sequence diagram illustrating a network-based gaming system according to an embodiment.

Referring to FIG. 1, a network-based gaming system 100 may include one or more clients 110A to 110C and a server 120. The server 120 may be a cloud server or a server cluster that includes a plurality of servers. The server 120 may be connected to a network and communicates with the one or more clients 110A to 110C through the network. The server 120 may be a remote computer system that provides one or more software services to the one or more clients 110A to 110C. For example, the server 120 may provide a gaming streaming service to the one or more clients 110A to 110C by generating and rendering game contents by a gaming engine running on the server 120. However, the one or more embodiments are not limited thereto, and the server 120 may be a server that provides other types of services, such as online video and/or audio streaming services.

The one or more clients 110A to 110C may be a personal computer (PC), a laptop, a personal digital assistant (PDA), a mobile device, a console, a tablet PC, a wearable device, etc. In an embodiment, the one or more clients 110A to 110C may be software running on a computer to request and receive information from the server 120. For example, in a cloud gaming environment, the one or more clients 110A to 110C may be a computer or a mobile device running a cloud gaming client software that sends user control information to the server 120, receives video streaming from the server 120 and displays the received video streaming on a display of the computer or the mobile device to be viewed by a user.

Game streaming provides a unique way to play video games by running one or more game software on a remote server, as opposed to on a game console or other local device. The gaming content may be compressed by a video encoder on the server-side and may be streamed to the one or more clients via the network. This provides several unique advantages in the game streaming services. First, because dedicated servers used by game streaming companies are significantly more powerful than hardware on the consumer-end, video encoding and rendering can be performed at a rate much faster than the hardware on the consumer-end. Generally, local machines decrease in performance overtime due to wear and tear. In contrast, cloud gaming servers are continuously upgraded as technology develops, and bear no extra cost to the consumer for upgrading the gaming performance. Moreover, streaming services can send similar data to multiple users who may be playing the same game, thereby reducing the processing load for processing gaming content for each user.

Referring to FIG. 1, a user B of the client 110B may be playing the same game as a user A of a client 110A and a user C of a client 110C. The client 110B among the plurality of clients may detect an action performed by a user B of the client 110B (S101). For example, an action may be a shooting, picking up an item, and any other action that may be performed by a user in a game. The client 110B may transmit the detected action to the server 120 (S102). The server 120 may receive the detected action transmitted from the client 110B, and analyze the detected action and determine a new state of the game (S103). For example, if the detected action performed by the user B of the client 110B is shooting another player, the server 120 may determine the result of the shooting as a new state to be displayed to users in the same game. The server 120 may transmit the determined new state to the client 110A, the client 110B and the client 110C (S104). Each of the client 110A, the client 110B and the client 110C may receive the determined new state and display the new state on a display (S105).

Figure 2:
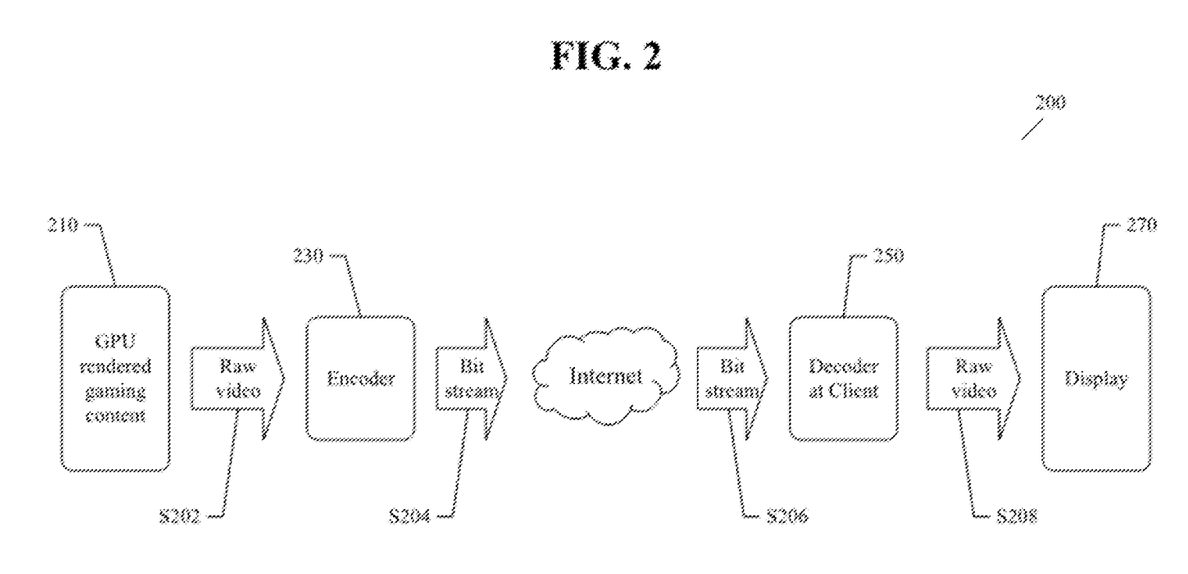
FIG. 2 is a diagram illustrating an operation of a network-based gaming system according to an embodiment.

FIG. 2 is a diagram illustrating an operation of a network-based gaming system according to an embodiment.

Referring to FIG. 2, a network-based gaming system 200 may include an encoder 230 on a server-side and a decoder 250 on a client-side. Although the network-based gaming system 200 according to this embodiment shows only one encoder and one decoder, the one or more embodiments are not limited thereto. There may be a plurality of servers including a plurality of encoders 230 to encode gaming video content. Also, there may be a plurality of client devices, each including one or more decoders 250 to decode the encoded gaming video content received from one or more servers.

In S202, the encoder 230 may receive a gaming content 210 as a raw video content. Here, the raw video content may refer to one or more images of the gaming content 210 prior to encoding. The encoder 230 may receive the raw video content of the gaming content 210 and code the raw video content. For example, a gaming software may run on the cloud server side, and gaming content may be rendered by graphic processing unit (GPU) of the server. The rendered gaming content may be fed into the encoder 230 as raw video contents, for example, in YUV format. However, the one or more embodiments are not limited thereto, and the format of the raw video contents may be any other coding format, such as RGB color.

In S204, the encoder 230 may generate a compressed video bitstream according to a certain video coding format or standard, such as H.264, H.265, AV1, AVS2, etc. The encoder 230 of the server may transmit the compressed video bitstream to the decoder 250 of the client 250 through the network. The operations of the encoder 230 will be described in more detail below with reference to FIG. 3.

In S206, the decoder 250 at the client may receive the compressed video bitstream generated by the encoder 230, and decode the compressed video bitstream into a video content to be displayed. The operations of the decoder 250 will be described in more detail below with reference to FIG. 4.

In S208, the decoded video bitstream may be transmitted to a display 270 of the client to be viewed by a user.

Figure 3:
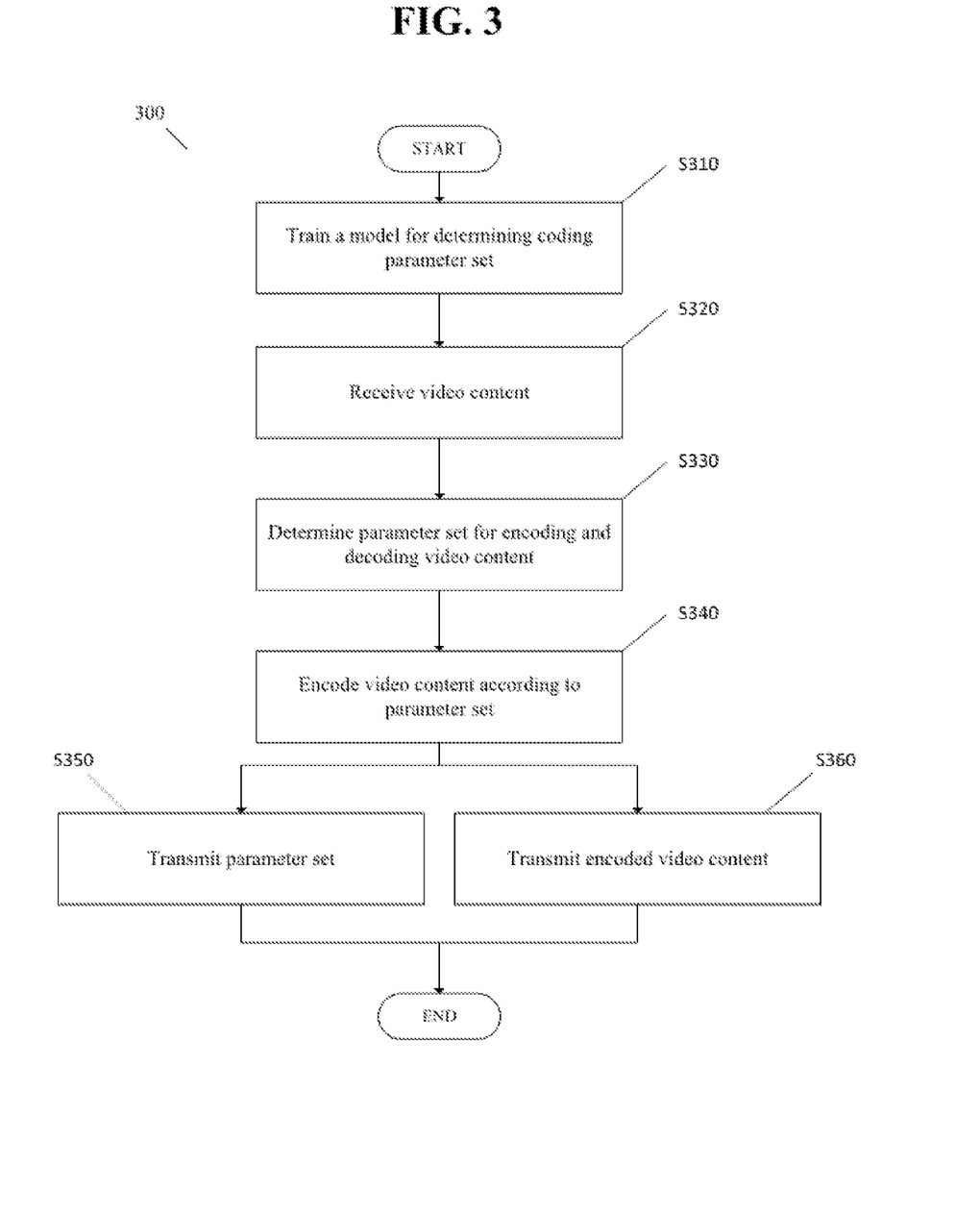
FIG. 3 is a flowchart illustrating an operation of an encoding device of a network-based gaming system according to an embodiment.

FIG. 3 is a flowchart illustrating an operation of an encoding device of a network-based gaming system according to an embodiment.

Referring to FIG. 3, a method of operating a learning-based video coding by an encoder is shown. As described above, the encoder may be disposed in the server to code the video content of a game.

In S310, the method may include training a model for determining coding parameter set by one or more processors of the server. In a learning-based video coding, a model may be trained using neural networks to determine optimal coding parameters, such as filter coefficients, through a large amount of diversified training data. Here, a parameter set may be a set of parameters that are used for encoding and/or decoding a video content.

In training, a selection of training data may heavily impact the overall performance of a particular video coding. That is, some training data may be more relevant to one type of video content as opposed to another type of video content. Accordingly, it is necessary to quickly identify certain training data over other training data to efficiently train a model for a certain type of video content.

In order to train a model more efficiently, one parameter set may be set for each type of video contents. For example, there may be different types of games, e.g., an action game, an adventure game, a role-playing game (RPG), a first-person shooter (FPS) game, a sports game and etc. For each game type, one optimal parameter set for coding and decoding the video content may be learned based on training data. For example, a model for determining a parameter set for an action game may be fed with training data more relevant to action games. Also, each parameter set may be associated with a parameter identifier (ID), and depending on the type of content, the parameter ID may be determined for each type of games. As such, a trained model may be specifically directed to each type of contents.

More specifically, a predetermined threshold may be set for an initial model of a certain content type such that the initial model is continuously trained until the initial model achieves the predetermined threshold. That is, various training data may be iteratively fed into the initial model until the initial model can output a parameter set for encoding the video content that is similar to test data at the predetermined threshold. Here, the test data may refer to data that should be output by a model when it is finally trained.

According to an embodiment, one or more models may be trained for each type of video contents using sample training data of various video contents. However, the one or more embodiments of the disclosure are not limited thereto, and only one model may be trained to generate a plurality of parameter sets to optimize encoding of the video content.

After training, one or more parameter sets may be assumed or agreed by both encoder and decoder to code video contents and decode the encoded video contents. In an embodiment, when the decoder receives a compressed video content, the decoder can decode the compressed video content according to the learning-based video coding performed by the encoder using the assumed parameter set. For example, when encoding a video content, the encoder may encode the video content using a set of filter coefficients to perform filtering on the reconstructed images of the video content. However, depending on the type of video content, a set of filter coefficients used for coding images of one video content may not be suitable for coding images of another video content. For example, a set of filter coefficients for coding images of an action game not be suitable or relevant to a set of filter coefficients that should be used for a sports game. Therefore, the server may determine different sets of parameters to code different types of video contents in order to improve quality of the video contents for each type of video contents.

In S320, an encoder may receive a video content. A video content may include one or more images that are sequentially arranged to constitute a video. Although it has been described that the video content may include gaming contents, the one or more embodiments are not limited thereto, and the video content may include any other types of contents, such as movies, dramas, short clips, and etc. The video content may also include audio content that is associated with one or more images of the video content. According to an embodiment, the encoder may receive video contents from a graphic processing unit (GPU) that processes and renders video contents. However, the one or more embodiments are not limited thereto, and the encoder may receive video contents from a video source, such as a camera.

In S330, an encoder may determine a parameter set for encoding and/or decoding a video content using a trained model. When the video content is received from a GPU or a camera, the encoder may identify the video content based on its type, size, quality and etc. The video content may include a header information that identifies its type, size and quality. For example, the header information may include information that identifies the video content as a game with a size of about 10 gigabytes at a resolution of 1280×720 pixels.

Based on the header information, the encoder may determine a parameter set for coding the video content. The encoder may use the trained model to determine the parameter set to be used for coding the received video content into a compressed video content. For example, there may be a title identifier, a game identifier, and/or content identifier associated with each video content, and the encoder may use such information select a parameter set to be used for coding the video content.

Alternatively, the encoder may not use any specific parameter set or the trained model may not be able to identify a parameter set that is suitable for the received video content. In such a case, the encoder may use a default parameter set to code the received video content.

In S340, the encoder may encode the video content according to the selected parameter set. That is, the encoder generates a compressed video bitstream according to a certain video coding format or standards, such as H.264, H.265, AV1, AVS2, etc. However, the one or more embodiments are not limited thereto, and the video contents may be encoded according to other video coding/compression standards, such as ITU-T H.266 (also referred to as Future Video Coding (FVC)).

In S350, the parameter set information may be transmitted to the client so that the decoder of the client can recognize the coding scheme of the encoder and decode the compressed video bitstream accordingly. According to an embodiment, a parameter set may be included in metadata that is transmitted to the client separately from the compressed video bitstream. For example, in cloud gaming, the server may derive a parameter set based on the training data of a particular gaming content, and transmit the parameter set to the client (that is, an end-user) as ancillary information through the network. The ancillary information may be in the form of system metadata, plug-in, etc. The user may then download the parameter set information prior to starting a game or decoding the video content. However, the one or more embodiments are not limited thereto, and the parameter set information may be added to header information of the compressed video content and transmitted to the client together with the compressed video content.

In S360, the encoded video bitstream may be transmitted to the client. Here, the encoded video bitstream may be transmitted separately from the parameter set, and transmitted simultaneously with the parameter set. However, the one or more embodiments are not limited thereto, and the parameter set may be transmitted prior to the encoded video bitstream so as to allow the decoder to recognize the parameter set used for encoding before receiving the encoded video bitstream. Also, the encoded video bitstream may be transmitted to the client prior to the parameter set.

Figure 4:
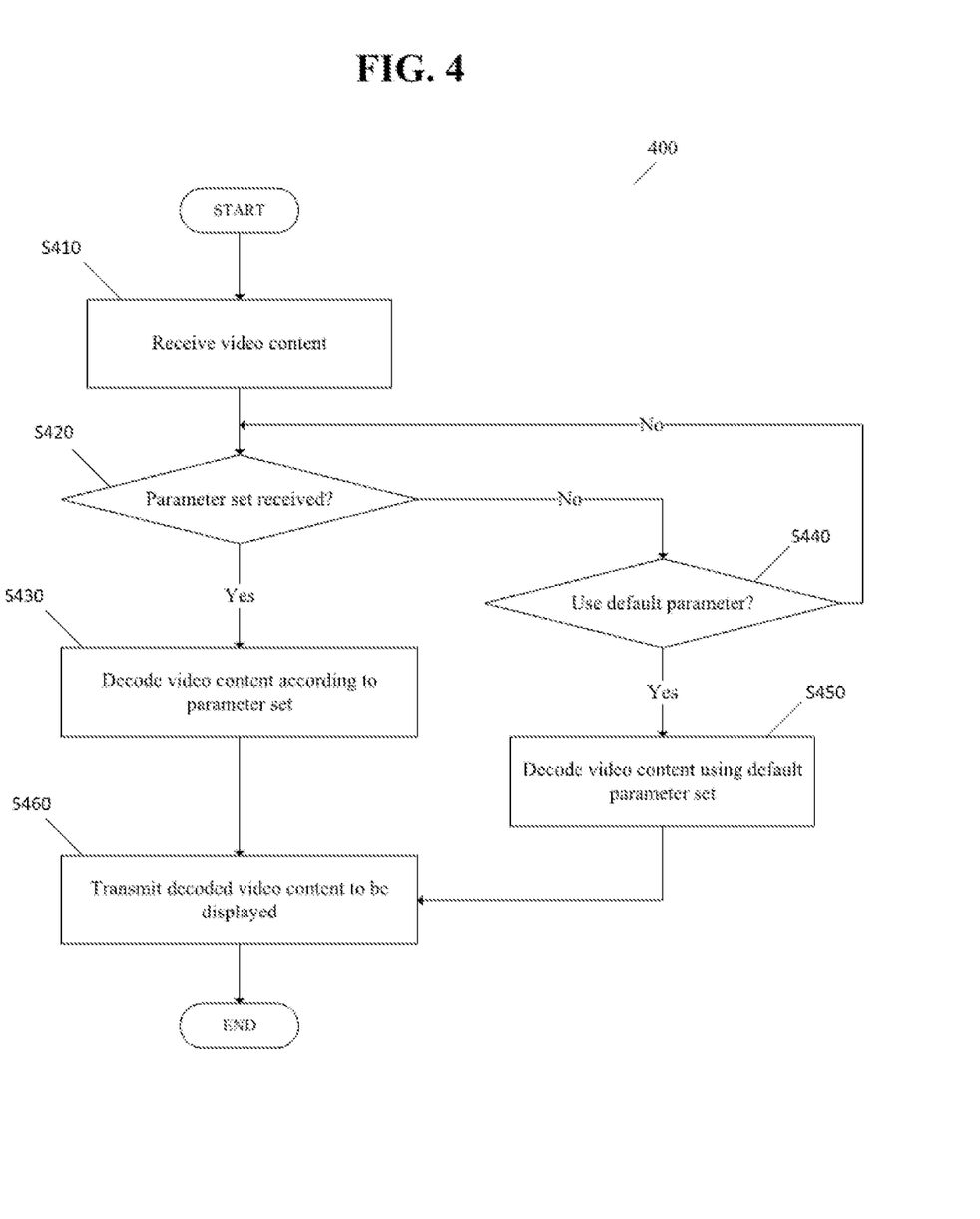
FIG. 4 is a flowchart illustrating an operation of a decoding device of a network-based gaming system according to an embodiment.

FIG. 4 is a flowchart illustrating an operation of a decoding device of a network-based gaming system according to an embodiment.

Referring to FIG. 4, a method of operating a learning-based video decoding by a decoder is shown. As described above, the decoder may be disposed in the client device to decode the video content received from the server.

In S410, the decoder may receive video bitstream from the server. Here, the video bitstream may refer to the video content coded by the encoder of the server.

In S420, the decoder may determine whether a parameter set is received from the server. That is, when the decoder receives one or more parameter sets from the server, the decoder may determine that the parameter set is received. According to an embodiment, the decoder may receive the one or more parameter sets separately from the video bitstream. For example, the decoder may receive the one or more parameter sets from the server prior to receiving the video bitstream. However, the one or more embodiments are not limited thereto, and the decoder may receive the video bitstream prior to receiving the one or more parameter sets.

In S430, when at least one parameter set is received from the server (S420: Yes), the decoder may decode the video bitstream according to the received parameter set. According to an embodiment, multiple parameter sets may be received by the decoder. For example, the encoder may code video content using multiple parameter sets, and those multiple parameter sets may be received by the decoder. In such a case, the decoder may select one or more parameter sets among the received multiple parameter sets and decode the video content according to the selected one or more parameter sets. Alternatively, the encoder may determine the multiple parameter sets to be used by the decoder, and send the multiple parameter sets to be used by the decoder. When selecting one or more parameter sets by either the encoder or the decoder, for example, a title identifier, a game identifier, and/or a content identifier may be used to select the one or more parameter sets. For example, if the video content to be decoded is a sports game indicated by the game identifier, the decoder may select a parameter set that is most suitable for the sports game according to a trained model. Here, the trained model may be a trained model used to encode the video content by the encoder.

In S440, when the decoder determines that no parameter set is received from the server (S420: No), then the decoder may further determine whether it should use a default parameter set to decode the received video bitstream. A default parameter set may be a predetermined parameter set that may be used to decode various types of video content. The default parameter set may be predefined by a user. As described above with respect to the encoder, the decoder may decode the compressed video bitstream according to a certain video coding format or standards, such as H.264, H.265, H.266, AV1, AVS2, etc.

In a sequence level syntax signaling, an indication flag may be used to indicate whether a default parameter set should be used or another parameter set can be obtained to replace the default parameter set. When it is determined that an alternative parameter set can be used to decode the received video bitstream (S440: No), the decoder may inquire the server to obtain another parameter set. However, the one or more embodiments are not limited thereto, and the decoder may obtain another parameter set stored in the client device, or any other server that may be capable of providing another parameter set to decode the received video bitstream.

In S450, when the decoder determines that a default parameter should be used according to the indication flag (S440: Yes), the decoder uses the default parameter set to decode the received video bitstream.

In S460, the decoder transmits the decoded video bitstream to a display of the client device.

Figure 5:
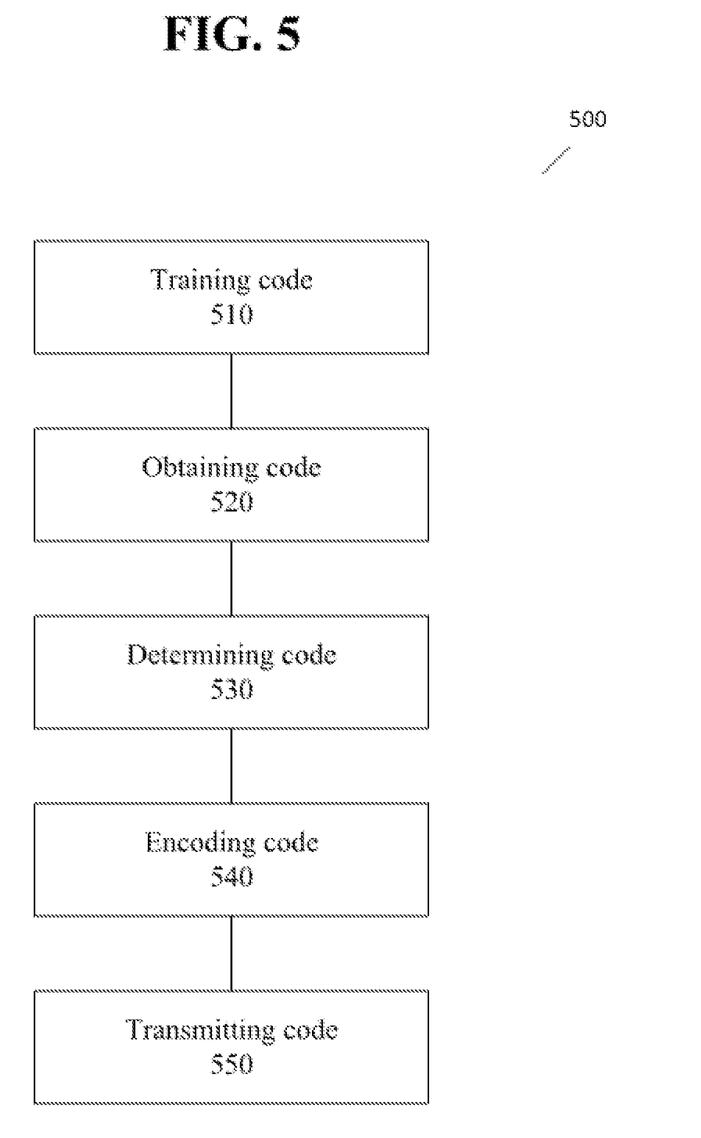
FIG. 5 is a block diagram illustrating an encoding device of a network-based gaming system according to an embodiment.

FIG. 5 is a block diagram illustrating an encoding device of a network-based gaming system according to an embodiment. An encoding device 500 may include at least one processor and at least one memory storing one or more computer program codes. The at least one processor may access at least one memory and operate as instructed by the one or more computer program codes.

Referring to FIG. 5, the encoding device 500 may include training code 510, obtaining code 520, determining code 530, encoding code 540 and transmitting code 550. It should be understood that some of the features or functions of the components of the encoding device of FIG. 5 are described above with reference to FIG. 3. Therefore, repeated descriptions thereof will be omitted.

The training code 510 may be configured to train a model for determining coding parameter set. The model may be trained using neural networks to determine optimal coding parameters such as filter coefficients, through a large amount of diversified training data. The training code 510 may perform operations of S310 described above with reference to FIG. 3.

The obtaining code 520 may be configured to receive a video content from a GPU that processes and renders video contents. The obtaining code 520 may perform operations of S320 described above with reference to FIG. 3.

The determining code 530 may be configured to determine a parameter set for encoding and/or decoding a video content using the trained model. The determining code 530 may perform operations of S330 described above with reference to FIG. 3.

The encoding code 540 may be configured to encode the video content according to a parameter set selected. The encoding code 540 may perform operations of S340 described above with reference to FIG. 3.

The transmitting code 550 may be configured to transmit parameter set information and the encoded video content to the client device. The transmitting code 550 may perform operations of S350 and S360 described above with reference to FIG. 3.

Figure 6:
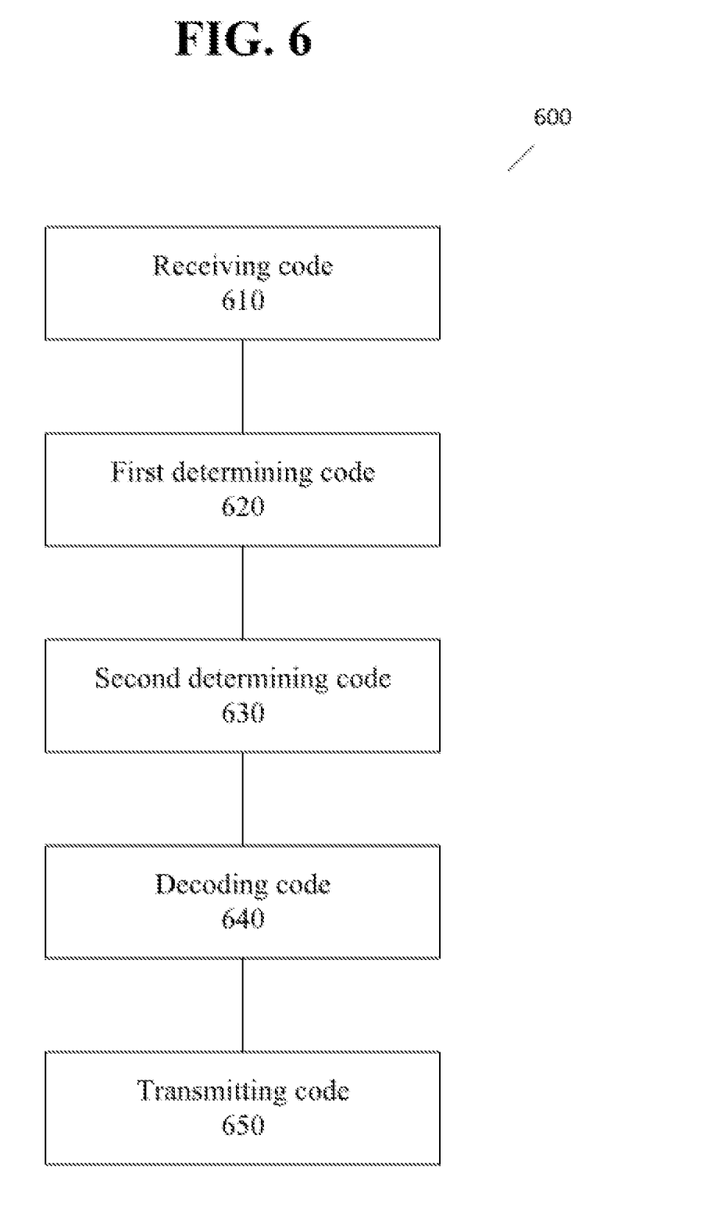
FIG. 6 is a block diagram illustrating a decoding device of a network-based gaming system according to an embodiment.

FIG. 6 is a block diagram illustrating a decoding device of a network-based gaming system according to an embodiment. A decoding device 500 may include at least one processor and at least one memory storing one or more computer program codes. The at least one processor may access at least one memory and operate as instructed by the one or more computer program codes.

Referring to FIG. 6, the decoding device 600 may include receiving code 610, first determining code 620, second determining code 630, decoding code 640 and transmitting code 650. It should be understood that some of the features or functions of the components of the decoding device of FIG. 6 are described above with reference to FIG. 4. Therefore, repeated descriptions thereof will be omitted.

The receiving code 610 may be configured to receive video bitstream from the server. The video bitstream may refer to the video content coded by the encoder of the server. The receiving code 610 may perform operations of S410 described above with reference to FIG. 4.

The first determining code 620 may be configured to determine whether a parameter set is received from the server. The first determining code 620 may perform operations of S420 described above with reference to FIG. 4.

The second determining code 630 may be configured to determine whether the decoder should use a default parameter set to decode the received video bitstream based on the first determining code 620 determining that no parameter set is received from the server. The second determining code 630 may perform operations of S440 described above with reference to FIG. 4.

The decoding code 640 may be configured to decode the video bitstream according to the determinations of the first determining code 620 and the second determining code 630. That is, when at least one parameter is received from the server, the decoding code 640 may decode the video bitstream according to the received parameter set. Alternatively, when the first determining code 620 determines that no parameter set is received from the server and the second determining code 630 determines that the default parameter should be used for decoding the video bitstream, the decoding code 640 may decode the video bitstream according to the default parameter set. The decoding code 640 may perform operations of S430 and S450 described above with reference to FIG. 4.

The transmitting code 650 may be configured to transmit the decoded video bitstream to a display of the client device.

Figure 7:
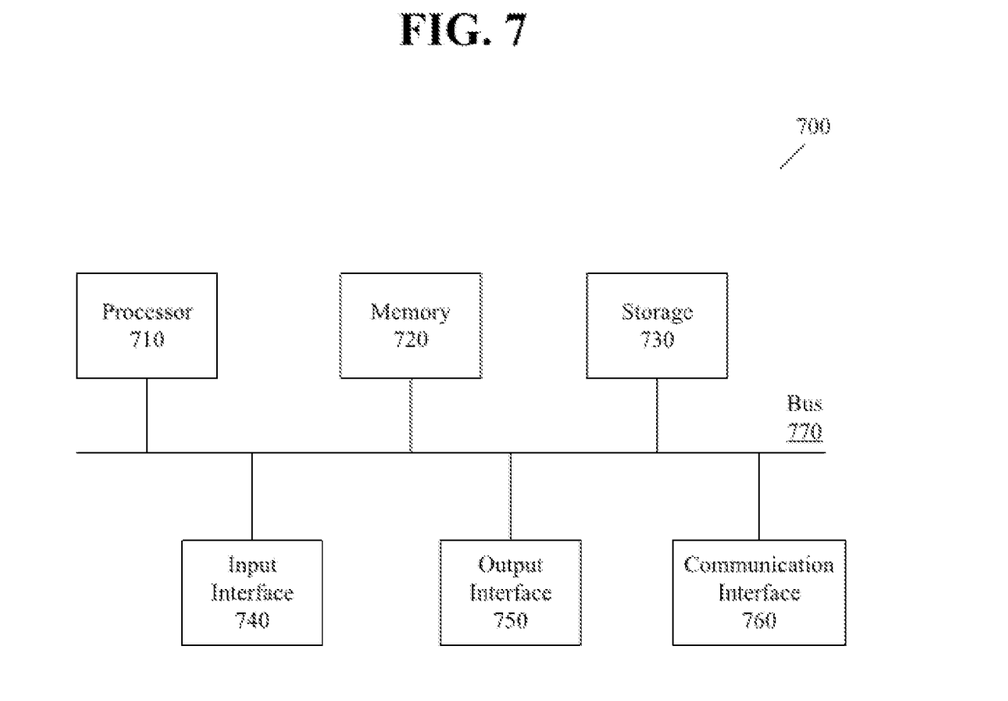
FIG. 7 is a diagram illustrating an example of a computer implemented in an encoding device and a decoding device of a network-based gaming system according to an embodiment.

FIG. 7 is a diagram illustrating an example of a device of a network-based gaming system according to an embodiment. A device 700 may be implemented in the encoding device 500 and the decoding device 600 of a network-based gaming system.

Referring to FIG. 7, the device 700 may include a processor 710, a memory 720, a storage 730, an input interface 740, an output interface 750, a communication interface 760, and a bus 770.

The processor 710 is implemented in hardware, firmware, or a combination of hardware and software. The processor 710 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 710 includes one or more processors capable of being programmed to perform a function.

The memory 720 includes a random access memory (RAM), a read only memory (ROM), and/or another type of dynamic or static storage device (e.g., a flash memory, a magnetic memory, and/or an optical memory) that stores information and/or instructions for use by the processor 710.

The storage 730 stores information and/or software related to the operation and use of the device 700. For example, the storage 730 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input interface 740 includes a component that permits the device 700 to receive information, such as via user input (e.g., a touch screen display, a keyboard, a keypad, a mouse, a button, a switch, and/or a microphone). Additionally, or alternatively, the input interface 740 may include a sensor for sensing information (e.g., a global positioning system (GPS) component, an accelerometer, a gyroscope, and/or an actuator). The output interface 750 includes a component that provides output information from the device 700 (e.g., a display, a speaker, and/or one or more light-emitting diodes (LEDs)).

The communication interface 760 includes a transceiver-like component (e.g., a transceiver and/or a separate receiver and transmitter) that enables the device 700 to communicate with other devices, such as via a wired connection, a wireless connection, or a combination of wired and wireless connections. The communication interface 760 may permit the device 700 to receive information from another device and/or provide information to another device. For example, the communication interface 760 may include an Ethernet interface, an optical interface, a coaxial interface, an infrared interface, a radio frequency (RF) interface, a universal serial bus (USB) interface, a Wi-Fi interface, a cellular network interface, or the like.

The bus 770 includes a component that permits communication among the components of the device 700.

The device 700 may perform one or more operations described herein. The device 700 may perform operations described above in response to the processor 710 executing software instructions stored in a non-transitory computer-readable medium, such as the memory 720 and/or the storage 730. A computer-readable medium is defined herein as a non-transitory memory device. A memory device includes memory space within a single physical storage device or memory space spread across multiple physical storage devices.

Software instructions may be read into the memory 720 and/or the storage 730 from another computer-readable medium or from another device via the communication interface 760. When executed, software instructions stored in the memory 720 and/or the storage 730 may cause the processor 710 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 7 are provided as an example. In practice, the device 700 may include additional components, fewer components, different components, or differently arranged components than those shown in FIG. 7. Additionally, or alternatively, a set of components (e.g., one or more components) of the device 700 may perform one or more functions described as being performed by another set of components of the device 700.

Some of the embodiments of the disclosure have been shown and described above. However, the one or more embodiments of the disclosure are not limited to the aforementioned specific embodiments. It may be understood that various modifications, substitutions, improvements and equivalents thereof can be made without departing from the spirt and scope of the disclosure. It should be understood that such modifications, substitutions, improvements and equivalents thereof shall fall within the protection scope of the disclosure, and should not to be construed independent from the inventive concept or prospect of the disclosure.

What is claimed is:

1. A method of performing video coding in a network-based system, performed by an encoding device, the method comprising:
    obtaining a video content;
    determining an encoding parameter set for encoding the video content and a decoding parameter set for decoding the video content among multiple parameter sets,
        wherein the multiple parameter sets for encoding the video content and decoding the video content are generated using a trained parameter set model,
        wherein the encoding parameter set for encoding the video content is selected specifically for an encoding instance and is based on a training data of a content type of the video content,
        wherein the decoding parameter set for decoding the video content is selected specifically for a decoding instance and is based on the training data of the content type of the video content, and
        wherein the content type of the video content includes a plurality of game types comprising at least one of a game genre and a game title;
    encoding the video content according to the encoding parameter set;
    transmitting the encoded video content to a decoding device;
    transmitting an indicator flag indicating to a decoder that the decoding parameter set is to be used for decoding the video content instead of a default parameter set; and
    transmitting the encoding parameter set to the decoding device, wherein the transmitting of the encoding parameter set is distinct from the transmitting of the encoded video content.

2. The method of claim 1, wherein a parameter set comprises a set of filter coefficients to perform filtering on one or more images of the video content.

3. The method of claim 1, wherein at least one parameter set is determined for each of the plurality of game types.

4. The method of claim 1, wherein the default parameter set is transmitted to the decoding device prior to the encoded video content, or wherein more than one default parameter set is transmitted to the decoding device prior to the encoded video content.

5. The method of claim 1, wherein the determined parameter set is transmitted to the decoding device as metadata.

6. A non-transitory computer-readable storage medium storing computer program code, the computer program code, when executed by at least one processor is configured to perform a method of claim 1.

7. An encoding device comprising:
    at least one memory storing a computer program code; and
    at least one processor configured to access the at least one memory and operate as instructed by the computer program code, the computer program code comprising:
        obtaining code configured to cause the at least one processor to obtain a video content;
        determining code configured to cause the at least one processor to determine an encoding parameter set for encoding the video content and a decoding parameter set for decoding the video content among multiple parameter sets,
            wherein the multiple parameter sets for encoding the video content and decoding the video content are generated using a trained parameter set model,
            wherein the encoding parameter set for encoding the video content is selected specifically for an encoding instance and is based on a training data of a content type of the video content,
            wherein the decoding parameter set for decoding the video content is selected specifically for a decoding instance and is based on the training data of the content type of the video content, and
            wherein the content type of the video content includes a plurality of game types comprising at least one of a game genre and a game title;
        encoding code configured to cause the at least one processor to encode the video content according to the encoding parameter set;
        first transmitting code configured to cause the at least one processor to control a communication interface to transmit the encoded video content to a decoding device;
        second transmitting code configured to cause the at least one processor to control the communication interface to transmit an indicator flag indicating to a decoder that the parameter set is to be used for decoding the video content instead of a default parameter set; and
        third transmitting code configured to cause the at least one processor to control the communication interface to transmit the encoding parameter set to the decoding device, wherein the transmitting of the encoding parameter set is distinct from the transmitting of the encoded video content.

8. The encoding device of claim 7, wherein a parameter set comprises a set of filter coefficients to perform filtering on one or more images of the video content.

9. The encoding device of claim 7, wherein at least one parameter is determined for each of the plurality of game types.

10. The encoding device of claim 7, wherein the determined parameter set is transmitted to the decoding device as metadata.

11. The encoding device of claim 7, wherein the default parameter set is transmitted to the decoding device prior to the encoded video content, or wherein more than one default parameter sets is transmitted to the decoding device prior to the encoded video content.

* * * * *